(12) United States Patent
Lambert et al.

(10) Patent No.: US 10,884,249 B2
(45) Date of Patent: Jan. 5, 2021

(54) COMBINER HEAD UP DISPLAY WITH SEPARATE INFRARED FUNCTION

(71) Applicant: Panasonic Automotive Systems Company of America, Division of Panasonic Corporation of North America, Peachtree City, GA (US)

(72) Inventors: David Kay Lambert, Sterling Heights, MI (US); Walter Joseph Nill, Davison, MI (US)

(73) Assignee: Panasonic Automotive Systems Company of America, Division of Panasonic Corporation of North America, Peachtree, GA (US)

(*) Notice: Subject to any disclaimer, the term of this patent is extended or adjusted under 35 U.S.C. 154(b) by 0 days.

(21) Appl. No.: 16/654,246

(22) Filed: Oct. 16, 2019

(65) Prior Publication Data

US 2020/0124862 A1    Apr. 23, 2020

Related U.S. Application Data

(60) Provisional application No. 62/749,225, filed on Oct. 23, 2018.

(51) Int. Cl.
*G09G 5/00* (2006.01)
*G02B 27/01* (2006.01)
*H04N 5/33* (2006.01)
*B60K 35/00* (2006.01)

(52) U.S. Cl.
CPC .......... *G02B 27/0179* (2013.01); *H04N 5/33* (2013.01); *B60K 35/00* (2013.01); *B60K 2370/1529* (2019.05); *B60K 2370/21* (2019.05); *B60K 2370/744* (2019.05); *G02B 2027/0187* (2013.01)

(58) Field of Classification Search
CPC ................ G02B 27/01; G02B 27/0101; G02B 27/0179; G02B 27/141; G02B 2027/0138; G02B 2027/0187; G02B 5/10; G02B 5/208; H04N 5/33; B60K 35/00; B60K 2370/21; B60K 2370/744; B60K 2370/1529
See application file for complete search history.

(56) References Cited

U.S. PATENT DOCUMENTS

| | | | | |
|---|---|---|---|---|
| 2003/0160153 A1* | 8/2003 | Hara | ...................... | H04N 5/202 250/214 VT |
| 2009/0153962 A1* | 6/2009 | Okada | ................ | G02B 27/0101 359/485.02 |
| 2009/0237803 A1* | 9/2009 | Hotta | ..................... | G02B 3/005 359/630 |
| 2010/0164702 A1* | 7/2010 | Sasaki | ..................... | G01B 21/22 340/438 |
| 2011/0187844 A1* | 8/2011 | Ogawa | ................... | G02B 27/01 348/78 |

(Continued)

*Primary Examiner* — Joe H Cheng
(74) *Attorney, Agent, or Firm* — Laurence S. Roach, Esq.

(57) ABSTRACT

A head up display arrangement is for a motor vehicle having a human occupant. A light source emits a light field. An infrared camera detects infrared energy. A combiner is positioned and configured to reflect the light field such that the light field can be viewed by the human occupant as a virtual image. The combiner has a region configured to reflect infra-red energy emitted by a face of the occupant such that the infrared energy is received by the infrared camera.

16 Claims, 4 Drawing Sheets

(56) References Cited

U.S. PATENT DOCUMENTS

| | | | |
|---|---|---|---|
| 2014/0177064 A1* | 6/2014 | Sugiyama | B60K 35/00 359/630 |
| 2015/0226964 A1* | 8/2015 | Sasaki | G02B 27/01 359/631 |
| 2016/0025973 A1* | 1/2016 | Guttag | B60K 35/00 345/7 |
| 2017/0038583 A1* | 2/2017 | Kim | B60R 1/00 |
| 2017/0371165 A1* | 12/2017 | Lambert | G02B 27/0101 |
| 2018/0081181 A1* | 3/2018 | Lambert | G02B 27/0103 |
| 2018/0088326 A1* | 3/2018 | Lambert | G02B 27/0101 |
| 2018/0101007 A1* | 4/2018 | Asai | B60K 35/00 |
| 2018/0101009 A1* | 4/2018 | Lambert | G02B 27/0103 |
| 2018/0321490 A1* | 11/2018 | Lambert | G02B 27/0101 |
| 2018/0335633 A1* | 11/2018 | Naruse | G06T 7/73 |
| 2019/0129172 A1* | 5/2019 | Misawa | G02B 27/0149 |
| 2020/0142477 A1* | 5/2020 | Smith | G06F 3/013 |
| 2020/0143184 A1* | 5/2020 | Naradikian | G02B 27/0179 |
| 2020/0201037 A1* | 6/2020 | Yamamoto | G02B 5/0833 |

\* cited by examiner

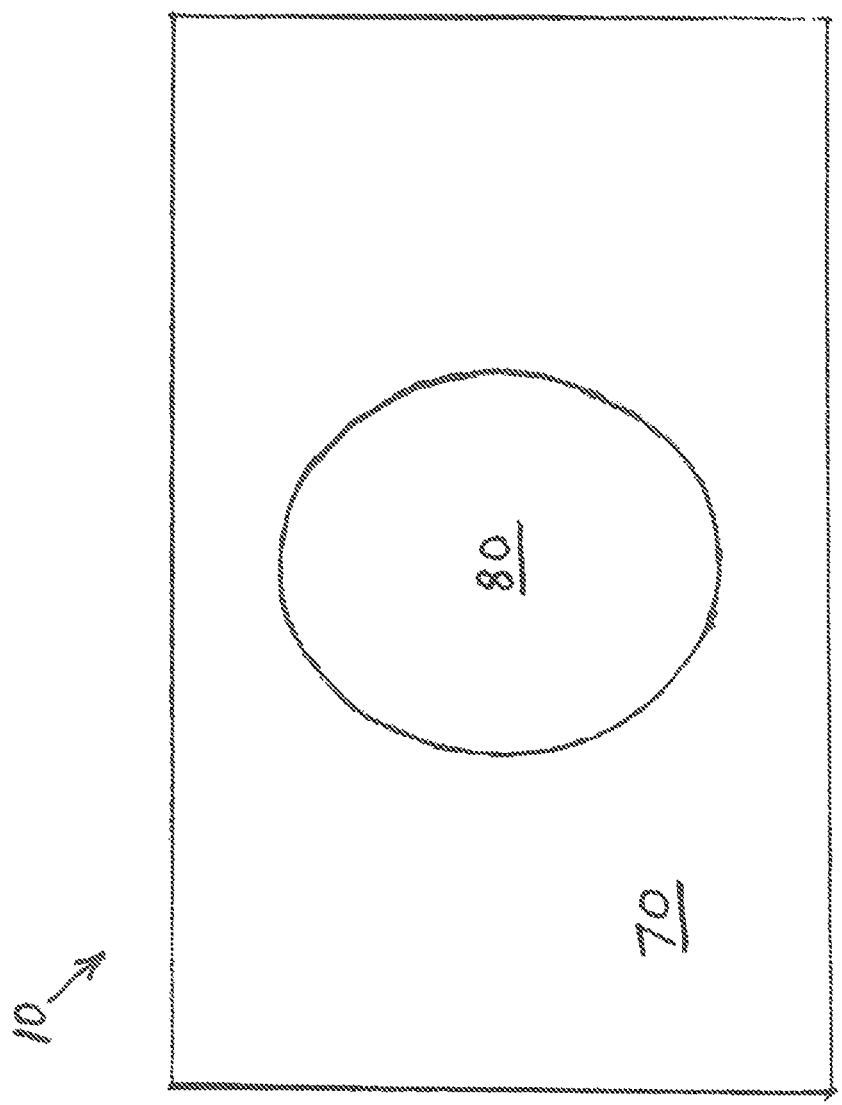
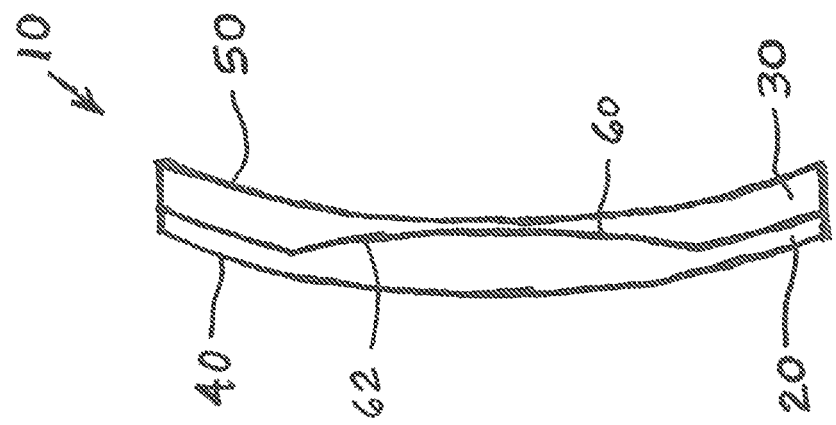
Fig. 1b
Fig. 1a

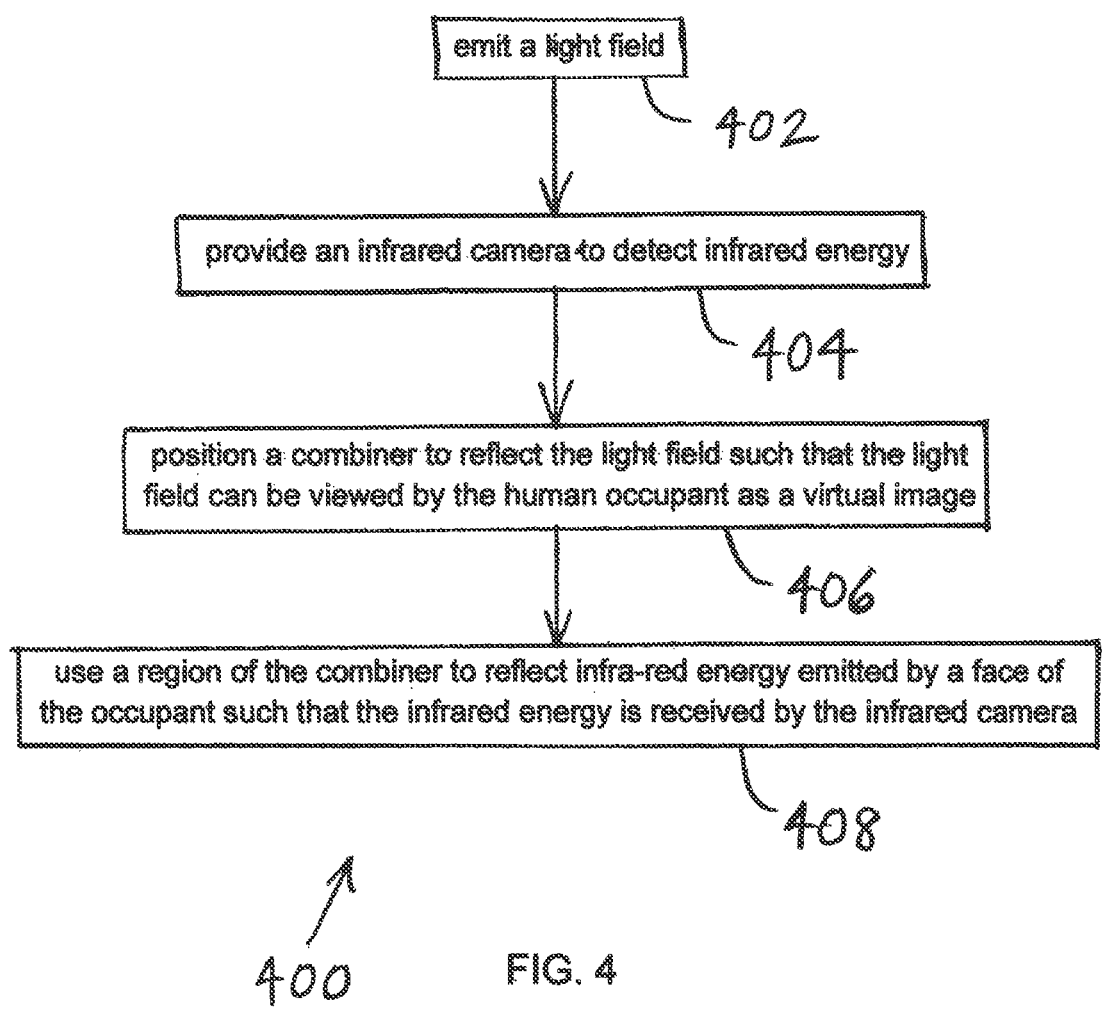

COMBINER HEAD UP DISPLAY WITH SEPARATE INFRARED FUNCTION

CROSS-REFERENCED TO RELATED APPLICATIONS

This application claims benefit of U.S. Provisional Application No. 62/749,225 filed on Oct. 23, 2018, the disclosure of which is hereby incorporated by reference in its entirety for all purposes.

FIELD OF THE INVENTION

The disclosure relates to a head up display (HUD) in a motor vehicle.

BACKGROUND OF THE INVENTION

A head up display emits light that reflects from the front windshield to be seen by the occupant. The light appears to come from a virtual image in front of the occupant and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the occupant, which is reflected from the windshield, appears to come from a virtual image that is outside of the vehicle. The mirrors and display are typically contained in a package that occupies a volume beneath the top surface of the dashboard.

SUMMARY

The present invention may enable a combiner head-up display (HUD) to implement an optical function for infrared light that is different from its function for visible light. A surface inside the combiner is used to reflect infrared light, but is not used to significantly reflect visible light.

In one embodiment, the invention comprises a head up display arrangement for a motor vehicle having a human occupant. A light source emits a light field. An infrared camera detects infrared energy. A combiner is positioned and configured to reflect the light field such that the light field can be viewed by the human occupant as a virtual image. The combiner has a region configured to reflect infra-red energy emitted by a face of the occupant such that the infrared energy is received by the infrared camera.

In another embodiment, the invention comprises a head up display method for a motor vehicle having a human occupant. A light field is emitted. An infrared camera is provided to detect infrared energy. A combiner is positioned to reflect the light field such that the light field can be viewed by the human occupant as a virtual image. A region of the combiner is used to reflect infra-red energy emitted by a face of the occupant such that the infrared energy is received by the infrared camera.

In yet another embodiment, the invention comprises a head up display arrangement for a motor vehicle having a human occupant. A light source emits a light field. An infrared camera detects infrared energy. A combiner is positioned and configured to reflect the light field such that the light field can be viewed by the human occupant as a virtual image. The combiner has at least one infrared-reflecting element disposed therein. The infrared-reflecting element is covered by transparent material. The infrared-reflecting element reflects infra-red energy emitted by a face of the occupant such that the infrared energy is received by the infrared camera.

An advantage of the present invention is that it enables a combiner HUD to also be used to monitor the occupant.

Another advantage of the present invention is that the dual-function combiner enables the occupant monitoring system to view the entire face of the occupant.

BRIEF DESCRIPTION OF THE DRAWINGS

A better understanding of the present invention will be had upon reference to the following description in conjunction with the accompanying drawings.

FIG. 1a is a side cross-sectional view of one embodiment of a HUD combiner of the present invention.

FIG. 1b is a front view of the HUD combiner of FIG. 1a.

FIG. 4 is a flow chart of one embodiment of a head up display method of the present invention for a motor vehicle having a human occupant.

DETAILED DESCRIPTION OF THE PREFERRED EMBODIMENTS

Figure 2:
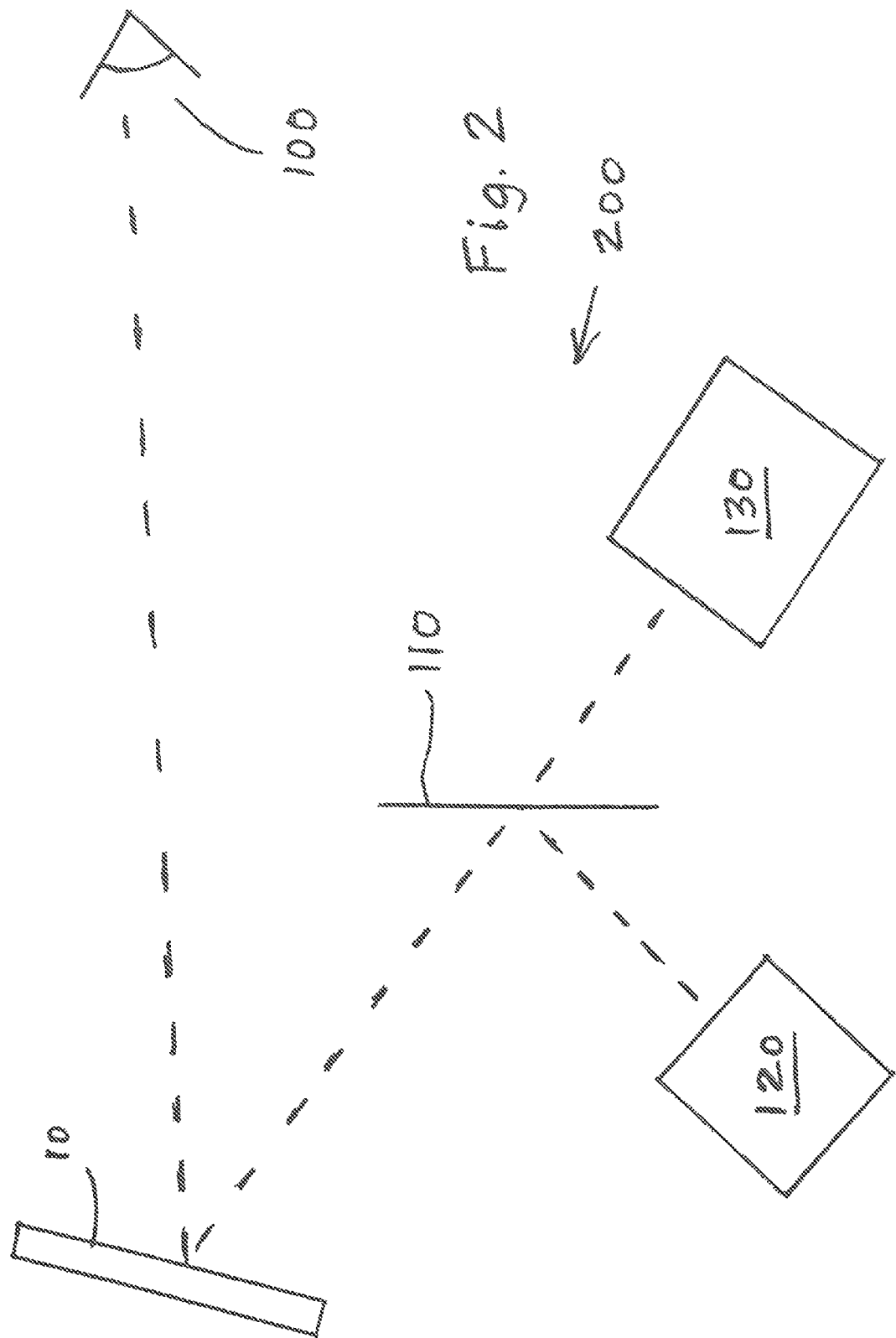
FIG. 2 is a side schematic view of one embodiment of a dual-function HUD and occupant monitoring arrangement of the present invention.

FIG. 1a illustrates one embodiment of a combiner 10 of the present invention for a HUD. Combiner 10 includes two mating transparent plastic parts 20 and 30. Part 30 includes an inner surface 50 that is nearest to the occupant. As used herein, the term "occupant" may include a driver or a passenger of a motor vehicle. Part 20 includes an outer surface 40 that is farthest from the occupant. Surfaces 50 and 40 reflect light from a projector so that the light is seen by the occupant as a virtual image, as with a conventional combiner HUD. Part 20 includes an inner surface 60 which mates with an outer surface 62 of part 30. Surfaces 60, 62 may conjunctively implement the infrared function of the combiner. When parts 20 and 30 are assembled together, infrared light may interact with surfaces 60, 62 to form a virtual image that is different from the virtual image seen with visible light. Circular or Oval-shaped region 80 (FIG. 1b) of surfaces 60, 62 is configured to reflect infrared light, but the remaining region 70 of surfaces 60, 62 is configured to be transparent to infrared light.

In one embodiment, parts 20, 30 are made of injection molded transparent plastic, as currently implemented for plastic lenses and mirrors used in HUDs. The two parts 20, 30 may be joined together with optically clear adhesive, which is available off-the-shelf in sheet form. To implement infrared reflectivity, one approach is to insert a plastic film that is reflective to infrared light, but is not significantly reflective to visible light, such as a film available from 3M Corporation. Another approach is to coat either of surfaces 60, 62 with a layer that reflects infrared light much more than it does visible light.

FIG. 2 illustrates one embodiment of a dual-function HUD and occupant monitoring arrangement 200 of the present invention including combiner 10, a cold mirror 110, a picture generation unit 120, and an infrared camera 130. FIG. 2 shows an application of the dual-function combiner in a combiner HUD that serves as an ordinary HUD to project a virtual image that can be seen by the occupant of a vehicle, and also serves to acquire an infrared image of the occupant's entire face for an occupant monitoring system. To implement the function of a conventional HUD, picture generation unit 120 creates a visible image. Light from the picture generation unit reflects from cold mirror 110 that reflects visible light and transmits infrared light. The visible light next reflects from dual function combiner 10. As viewed by the occupant 100, a virtual image is seen behind dual function combiner 10. Information is projected by the picture generation unit to be seen by the occupant to thereby provide visual information to the occupant. The conventional HUD is designed so the virtual image can be seen within an imaginary eye box (not shown) that typically does not include the entire face of the occupant.

A problem solved by the present invention is that, as seen from the position of an infrared camera 130 that views the occupant's face, the field of view is too small to see the entire face. In order to implement an occupant monitor system that views the entire face of the occupant from the viewpoint of infrared camera 130, the dual-function infrared-visible combiner 10 is used. As shown in FIG. 1a, for viewing infrared energy, a convex portion of the combiner (i.e., convex as viewed from the occupant's side) provides a circular or oval patch with an enlarged field of view of the occupant's face. Thus, the use of dual-function combiner 10 enables a system that projects visible light to be seen as a virtual image by the occupant as in a conventional combiner HUD, and an infrared-based occupant monitoring system that is able to view the entire face of the occupant.

Figure 3A:
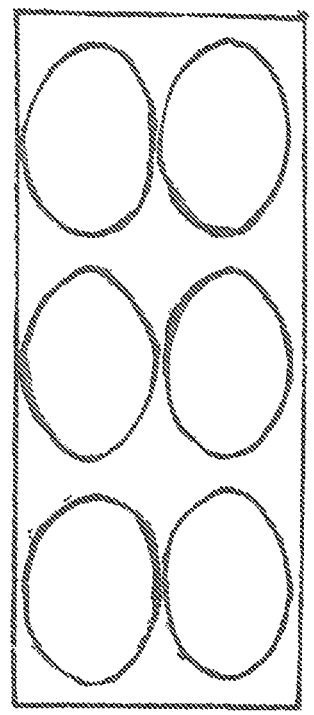
FIG. 3a is a front view of another embodiment of a HUD combiner of the present invention.

Further embodiments of a HUD combiner of the present invention are shown in FIGS. 3a-d. The combiner of FIG. 3a provides a single view of the occupant's head with an oval-shaped infrared light-reflecting region that is aligned in the horizontal direction rather than in the vertical direction, as is region 80 of FIG. 1b.

Figure 3B:
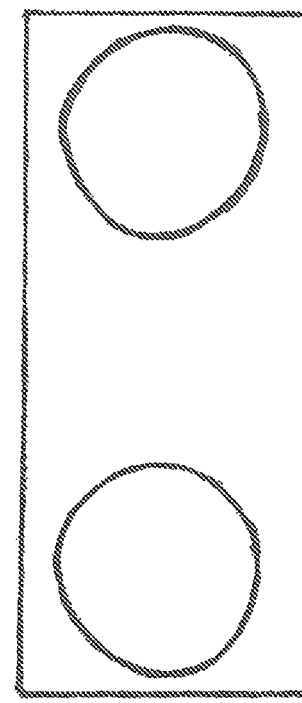
FIG. 3b is a front view of yet another embodiment of a HUD combiner of the present invention.

The combiner of FIG. 3b is a dual-function combiner with two convex circular regions that reflect infrared light, to provide a stereo view of the occupant's head. This may provide three-dimensional data.

Figure 3C:
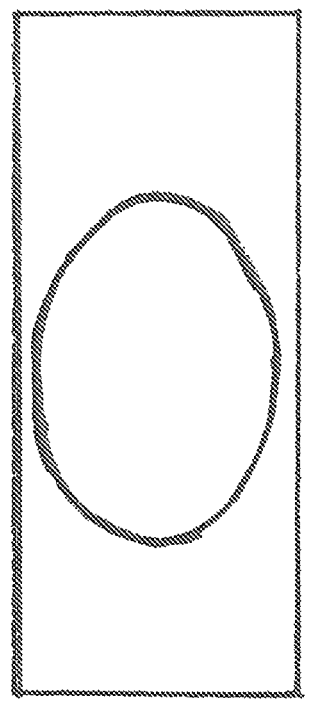
FIG. 3c is a front view of still another embodiment of a HUD combiner of the present invention.

The combiner of FIG. 3c is a dual-function combiner with more than two (i.e., six) convex regions that reflect infrared light, to provide more than two views of the occupant's head. This fly's eye view can implement different powers or angles.

Figure 3D:
FIG. 3d is a front view of a further embodiment of a HUD combiner of the present invention.

The combiner of FIG. 3d is a dual-function combiner that magnifies the infrared image very differently in the horizontal and vertical directions. That is, the infrared-reflecting region does not have to be round. The horizontal and vertical power can be different. FIG. 4 illustrates one embodiment of a head up display method 400 of the present invention for a motor vehicle having a human occupant. In a first step 402, a light field is emitted. For example, picture generation unit 120 may emit a light field.

In a next step 404, an infrared camera is provided to detect infrared energy. For example, infrared camera 130 may detect infrared energy.

Next, in step 406, a combiner is positioned to reflect the light field such that the light field can be viewed by the human occupant as a virtual image. For example, light from picture generation unit 120 may reflect from cold mirror 110 and then reflect from dual function combiner 10 toward occupant 100. As viewed by the occupant 100, a virtual image is seen behind dual function combiner 10.

In a final step 408, a region of the combiner is used to reflect infra-red energy emitted by a face of the occupant such that the infrared energy is received by the infrared camera. For example, As shown in FIGS. 1a-b and 2, a convex region of combiner 10 is used to reflect infra-red energy emitted by a face of occupant 100 such that the infrared energy is received by infrared camera 130.

In an alternative embodiment, an internally reflective surface is not used, but rather there is a flat on the back surface, and that side is coated to reflect infrared but not visible light. If the front and back surface are not parallel, there is a lens effect on transmitted light.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle having a human occupant, comprising:
   a light source configured to emit a light field;
   an infrared camera configured to detect infrared energy; and
   a combiner positioned and configured to reflect the light field such that the light field can be viewed by the human occupant as a virtual image, the combiner having a region configured to reflect infrared energy emitted by a face of the occupant such that the infrared energy is received by the infrared camera, wherein the combiner includes a first part and a second part, at least one infrared-reflecting element being disposed between the first part and the second part, wherein the infrared-reflecting element has an oval shape.

2. The head up display arrangement of claim 1 wherein the infrared-reflecting element has a convex infrared-reflecting surface.

3. The head up display arrangement of claim 1 wherein the infrared-reflecting element comprises a plastic film or a coating, the infrared-reflecting element being reflective to infrared light, and substantially non-reflective to visible light.

4. A head up display arrangement for a motor vehicle having a human occupant, comprising:
   a light source configured to emit a light field;
   an infrared camera configured to detect infrared energy; and
   a combiner positioned and configured to reflect the light field such that the light field can be viewed by the human occupant as a virtual image, the combiner having a region configured to reflect infrared energy emitted by a face of the occupant such that the infrared energy is received by the infrared camera, wherein the combiner includes a first part and a second part, at least one infrared-reflecting element being disposed between the first part and the second part, wherein the at least one infrared-reflecting element comprises a plurality of substantially identically-shaped infrared-reflecting elements.

5. The head up display arrangement of claim 4 further comprising a mirror positioned and configured to reflect the light field from the light source to the combiner, and to pass the infrared energy from the combiner to the infrared camera.

6. A head up display method for a motor vehicle having a human occupant, said method comprising:
    emitting a light field;
    providing an infrared camera to detect infrared energy;
    positioning a combiner to reflect the light field such that the light field can be viewed by the human occupant as a virtual image wherein the combiner includes a first part and a second part, at least one infrared-reflecting element being disposed between the first part and the second part, wherein the infrared-reflecting element has an oval shape; and
    using a region of the combiner to reflect infrared energy emitted by a face of the occupant such that the infrared energy is received by the infrared camera.

7. The method of claim 6 wherein the infrared-reflecting element has a convex infrared-reflecting surface.

8. The method of claim 6 wherein the infrared-reflecting element comprises a plastic film or a coating, the infrared-reflecting element being reflective to infrared light, and substantially non-reflective to visible light.

9. A head up display method for a motor vehicle having a human occupant, said method comprising:
    emitting a light field;
    providing an infrared camera to detect infrared energy;
    positioning a combiner to reflect the light field such that the light field can be viewed by the human occupant as a virtual image wherein the combiner includes a first part and a second part, at least one infrared-reflecting element being disposed between the first part and the second part, wherein the at least one infrared-reflecting element comprises a plurality of substantially identically-shaped infrared-reflecting elements; and
    using a region of the combiner to reflect infrared energy emitted by a face of the occupant such that the infrared energy is received by the infrared camera.

10. The method of claim 9 further comprising using a mirror to reflect the light field to the combiner, and to pass the infrared energy from the combiner to the infrared camera.

11. A head up display arrangement for a motor vehicle having a human occupant, comprising:
    a light source configured to emit a light field;
    an infrared camera configured to detect infrared energy; and
    a combiner positioned and configured to reflect the light field such that the light field can be viewed by the human occupant as a virtual image, the combiner having at least one infrared-reflecting element disposed therein, the infrared-reflecting element being covered by transparent material, the infrared-reflecting element being configured to reflect infrared energy emitted by a face of the occupant such that the infrared energy is received by the infrared camera, wherein the infrared-reflecting element has an oval shape.

12. The head up display arrangement of claim 11 wherein the combiner includes a first part and a second part, the at least one infrared-reflecting element being disposed between the first part and the second part.

13. The head up display arrangement of claim 11 wherein the infrared-reflecting element has a convex infrared-reflecting surface.

14. The head up display arrangement of claim 11 wherein the infrared-reflecting element comprises a plastic film or a coating, the infrared-reflecting element being reflective to infrared light, and substantially non-reflective to visible light.

15. A head up display arrangement for a motor vehicle having a human occupant, comprising:
    a light source configured to emit a light field;
    an infrared camera configured to detect infrared energy; and
    a combiner positioned and configured to reflect the light field such that the light field can be viewed by the human occupant as a virtual image, the combiner having at least one infrared-reflecting element disposed therein, the infrared-reflecting element being covered by transparent material, the infrared-reflecting element being configured to reflect infrared energy emitted by a face of the occupant such that the infrared energy is received by the infrared camera, wherein the at least one infrared-reflecting element comprises a plurality of substantially identically-shaped infrared-reflecting elements.

16. The head up display arrangement of claim 15 further comprising a mirror positioned and configured to reflect the light field from the light source to the combiner, and to pass the infrared energy from the combiner to the infrared camera.

* * * * *